United States Patent [19]
Harvey et al.

[11] Patent Number: 5,189,773
[45] Date of Patent: Mar. 2, 1993

[54] MAST FORMING AND DEPLOYMENT SYSTEM

[75] Inventors: T. Jeffrey Harvey; P. Alan Jones, both of Goleta, Calif.

[73] Assignee: AEC-Able Engineering Co., Inc., Goleta, Calif.

[21] Appl. No.: 730,238

[22] Filed: Jul. 15, 1991

[51] Int. Cl.⁵ .............................................. B23P 17/00
[52] U.S. Cl. .................................... 29/33 D; 52/108
[58] Field of Search ................. 29/33 D, 33 T, 33 R; 52/108; 138/158, 156; 227/81, 20, 155; 493/179; 405/183

[56] References Cited

U.S. PATENT DOCUMENTS

| | | | |
|---|---|---|---|
| 3,144,215 | 8/1964 | Klein | 52/108 X |
| 3,360,894 | 1/1968 | Sharman et al. | 52/108 |
| 3,361,377 | 1/1968 | Trexler, Jr. | 52/108 X |
| 3,608,844 | 9/1971 | Tumulty, Jr. et al. | 242/54 |
| 3,696,568 | 10/1972 | Berry | 242/54 R X |
| 4,397,585 | 8/1983 | Fouss et al. | 405/183 |

FOREIGN PATENT DOCUMENTS

| | | | |
|---|---|---|---|
| 883024 | 6/1943 | France | 29/33 D |
| 1361833 | 4/1964 | France | 52/108 |

Primary Examiner—William Briggs
Attorney, Agent, or Firm—Donald D. Mon

[57] ABSTRACT

A mast forming and deployment system comprising a storage reel for storing a strip of sheet metal wound on the reel, and a tube forming a deployment apparatus. The strip is fed to ploy guides that form the sheet metal into a tube with overlapping edges. A drive system feeds the strip of sheet metal to and through the tube forming apparatus and drives staples which hold together the overlapping edges.

8 Claims, 2 Drawing Sheets

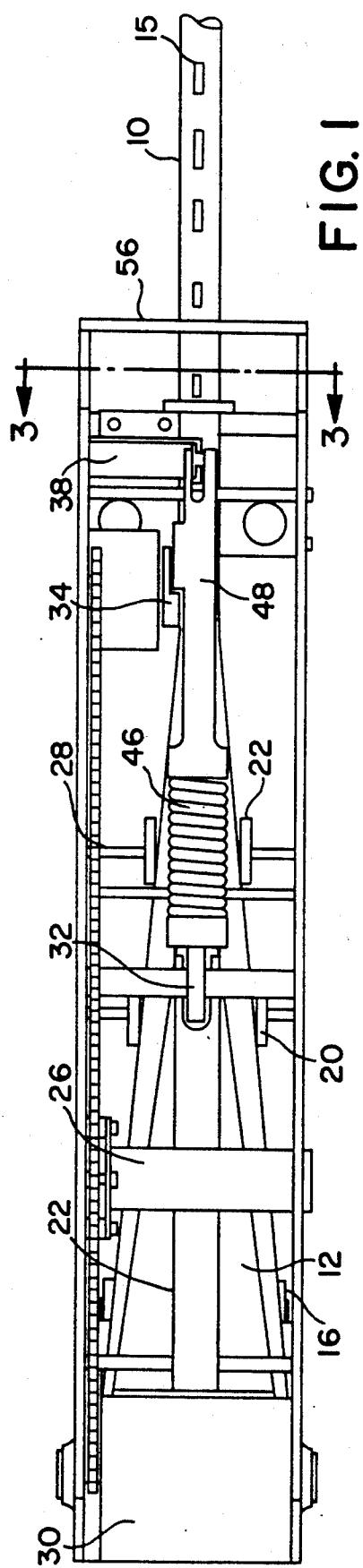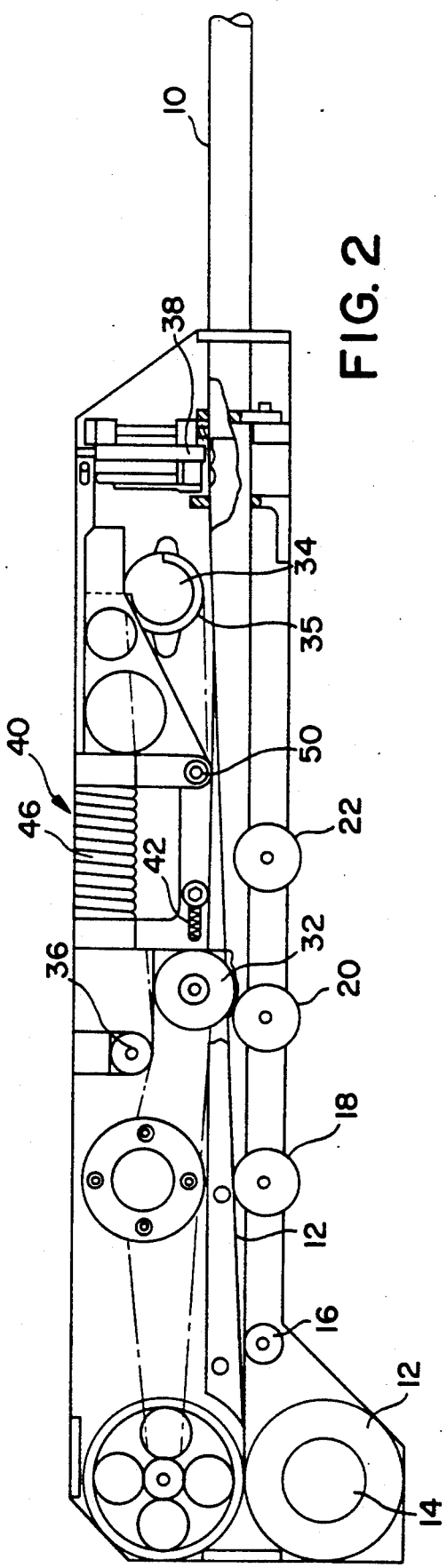

MAST FORMING AND DEPLOYMENT SYSTEM

FIELD OF THE INVENTION

This invention relates to formation and deployment of masts from sheet metal initially coiled flat on a reel.

BACKGROUND OF THE INVENTION

Masts are widely used in industry, in the military, and in space. Familiar uses for such masts are to support antenna, sensors, and solar panels. Inherently these are long structures, because they are intended to support objects at a considerable distance from the ground or from a vehicle and require a considerable stiffness.

Devices of suitable length are generally not transportable in their extended (deployed) condition. Accordingly a substantial body of art has been developed which provides for storage of the mast elements in smaller envelopes. Examples are collapsible or foldable structures carried in a cannister or other container while collapsed, and are deployed at the point of usage. Some masts can be retracted after deployment; others cannot. Both types are useful.

One typical type of mast may involve three or more flexible longerons coilable in a container. When deployed, they are linked together to form a rigid structure. Another type of mast has hinged-together rigid rods, and means to hold them in a stable configuration. What these types have in common is a considerable bulk and complexity.

There are many applications in which a one-time non-retractable deployment is suitable. In such a situation the potential advantages of storage of the mast material coiled on a reel become available.

In fact, efforts have been made to utilize coiled metal to set up masts. However, in order to maintain structural integrity they use initially curved strip flattened onto the reel, and a plurality of layers. This adds to the cost and weight of the device. Especially in space and airborne applications this is undesirable.

It is an object of this invention to provide a one-shot deployment of initially flat coiled metal into a cylindrical mast, the mast being suitably rigid, and made of a single piece of metal.

BRIEF DESCRIPTION OF THE INVENTION

According to this invention, a coil of sheet metal is wound flat on a reel. In one embodiment, the metal may be springy, and pre-formed to the cylindrical shape. It is flattened onto the reel, and resumes its shape when fed off the reel. In another embodiment, the metal is ductile. When it is fed from the reel it is formed to the cylindrical shape. In both situations, ploy guides (sometimes called "forming dies") guide the metal into its deployed condition. The difference between the two embodiments is the pre-form of the springy metal and the shape-forming of the ductile material.

According to a feature of this invention, staples are driven periodically through the overlapping edges, thereby holding the metal in its rolled configuration and providing an extended longitudinal tubular member of sufficient and reliable stiffness.

The above and other features and advantages of this invention will be fully understood from the following detailed description and accompanying drawings, in which:

BRIEF DESCRIPTION OF THE DRAWINGS

FIG. 1 is a top view of a tubular mast forming and deployment apparatus;

FIG. 2 is a side elevation of the tubular mast forming and deployment apparatus with a side panel removed.

DETAILED DESCRIPTION OF THE INVENTION

Figure 3:
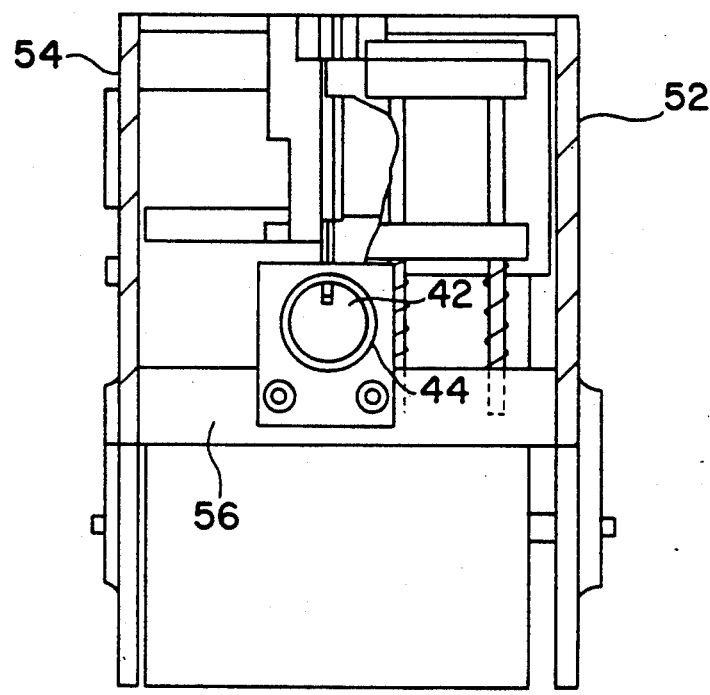
FIG. 3 is a sectional view taken at line 3—3 in FIG. 1.

Tubular mast forming and deployment apparatus according to this invention is shown in top view in FIG. 1 and in side view in FIG. 2. Metal to form a tubular mast 10 is stored initially flat on a reel (flat in the sense that it is not initially curled around its longitudinal axis. Sheet metal 12 is fed from storage spool 14 to ploy guides (sometimes called a "forming die") 16, 18, 20 and 22. The rolled (curled) tubular mast is then periodically stapled along a seam 24 formed by overlapping edges, as will be described in detail hereinafter.

Drive motor 26 feeds sheet metal 12. Motor 26 drives timing belt 28 to drive a wheel 30. Wheel 30 is in contact with the metal on the reel and drives the metal, turning the reel as it does so. Timing belt 28 also drives timig cam 32 and staple release 34. Tension is maintained on timing belt 28 by an adjustable idler 36. Drive motor 26 is preferably a drive system that has a power-off brake to prevent rotation of timing belt 28 when power is off.

Mast 10 will be stapled at suitable intervals. Staple timing cam 32 sets this interval. Staple release cam 34 has an offset 35 that controls the release of staples by set spring 40 with each rotation. The selected diameter of cam 34 provides an appropriate interval. Each revolution of staple release cam 34 releases stapler set spring 40 to drive a staple from stapler 38 into the tubular mast 10.

The staples stabilize the seam, preventing its separation, and preventing relative shear movement of its edges. The tube becomes rigid. The staples are formed with the use of an anvil 42 having a groove 44 acting to deform the staples as they are set. Anvil 42 is integral to an internal ploy guide that assists in forming the sheet metal 12 into a tube. The metal is penetrated by the legs of staples from stapler 38 which are designed to cut a radius on the inside edge of the penetration hole. Recess 44 and anvil 42 plastically deform each staple when they are set.

The energy required to set each staple is stored in the compression spring 46 and in the cam mechanism 34, allowing a rapid reset. Spring 46 and anvil 42 (FIG. 3) are structurally linked so that no staple setting forces react with the tubular mast 10. Resulting dynamic forces are minimized. Each rotation of cam 32 causes set spring 46 to activate arm 48 pivoted at 50 to drive staples from stapler 38 into mast 10 along seam 15 at appropriate intervals.

The stapler 38 has a magazine activated by staple travel spring 42 which feeds metal staples after each staple setting sequence. The stapler is very similar to the desk top stapler found on nearly any office desk top.

Timing of mast movement and staple operation are controlled by redundant belt system 28 driven by motor 26, providing deployment power to force the metal through ploy guides, to staple mast movement timing cam 32, to staple release cam 34, and to staple set spring 46 while also acting as a rate control. As one example, an approximately 100 feet by ½ inch outer diameter tubular mast can be deployed from a storage volume of about 131 cubic inches of sheet metal 12 stored on storage spool 14. Power from any convenient power source (not shown) drives belt system 28 to drive reel 30, which in turn drives storage spool 14 feeding sheet metal 12 to ploy guides 16, 18, 20 and 22.

Staple timing cam 32 advances staples to staple gun 38 simultaneously with rotation and delivery of sheet material 12 to anvil 42. The timing cam operates staple mechanism comprised of staple spring 46 and stapler 38 to set staples in mast 10, in this example at one foot intervals. In the example, this system can be packaged in a frame comprised of side walls 54 and 52 and end wall 56 having dimensions of approximately 4 inches wide by 5 inches high by 22 inches long to deploy the mast.

In the embodiment just described, the ploy guides act as dies turning the material into the rolled shape. The drive means forces the ductible metal through them. With obvious and immaterial modifications, the same device can pay out a length of springy material which had been wound flat onto the reel. The springy material had been pre-formed to the curled condition, and was then laid flattened onto the reel. The concepts and operations of the device for the two embodiments are identical.

This invention is not to be limited by the embodiments shown in the drawings and described in the description which are given by way of example and not of limitation, but only in accordance with the scope of the appended claims.

We claim:

1. A mast forming and deployment system comprising for forming a self-supporting mast:

storage means for storing a strip of sheet metal as a coil;

tube forming means for guiding said sheet metal to form a tube with overlapping edges;

feed means for feeding said sheet metal to said tube forming means and for driving said sheet metal through it;

stapling means for stapling said tube at its overlapping edges as it exits from said tube forming means by driving rigid staples through said tube and against anvil means on said tube forming means.

2. The system according to claim 1 in which said storage means comprises a storage reel.

3. The system according to claim 2 in which tube forming means comprises; a plurality of tube forming ploys; said ploys guiding said sheet metal into said tubular shape as it is fed through the reel.

4. The system according to claim 3 in which said feed means comprises a drive wheel in rotatable contact with the metal on said storage reel, and drive means for rotating said drive wheel.

5. The system according to claim 1 in which said metal is ductible, said tube forming means folding said metal to said tubular shape.

6. The system according to claim 4 in which said staple means is operated by said drive means and a timing cam; said timing cam constructed so as periodically to install said staples.

7. The system according to claim 6 in which said drive means includes a drive motor, and a redundant drive drive belt, said drive belt connecting said drive motor, said drive reel and said timing cam.

8. The system according to claim 1 in which said thin sheet metal is Be Cu whereby the metal can be preformed to a tubular shape, and flattened for storage, and restores its own shape as it is released from said reel.

* * * * *